(12) United States Patent
Banerjee et al.

(10) Patent No.: US 8,829,894 B2
(45) Date of Patent: Sep. 9, 2014

(54) CONTROL DEVICE

(75) Inventors: Dev Kumar Banerjee, Southampton (GB); Charles Edward Downs, Wimborne (GB)

(73) Assignee: Penny & Giles Controls Limited, Christchurch, Dorset (GB)

( * ) Notice: Subject to any disclaimer, the term of this patent is extended or adjusted under 35 U.S.C. 154(b) by 417 days.

(21) Appl. No.: 13/168,819

(22) Filed: Jun. 24, 2011

(65) Prior Publication Data

US 2012/0025809 A1 Feb. 2, 2012

(30) Foreign Application Priority Data

Jul. 27, 2010 (GB) .................................. 1012520.1

(51) Int. Cl.
*G01B 7/30* (2006.01)
*G05G 7/02* (2006.01)
*G01B 7/00* (2006.01)
*G05G 9/047* (2006.01)
*G01D 5/14* (2006.01)
*C22C 5/06* (2006.01)
*G01D 5/12* (2006.01)

(52) U.S. Cl.
CPC .. *C22C 5/06* (2013.01); *G05G 7/02* (2013.01); *G01B 7/00* (2013.01); *G05G 9/047* (2013.01); *G01D 5/145* (2013.01); *G01D 5/12* (2013.01)
USPC .............. 324/207.2; 324/207.13; 324/207.22; 324/207.26; 345/156

(58) Field of Classification Search
USPC .............. 324/207.2, 207.13, 207.22, 207.26, 324/239, 252, 253, 326, 529
See application file for complete search history.

(56) References Cited

U.S. PATENT DOCUMENTS 5,850,142 A * 12/1998 Rountos et al. ............ 324/207.2
7,210,451 B2 * 5/2007 Ikeda et al. .................. 123/399

(Continued)

FOREIGN PATENT DOCUMENTS

DE 102006030319 A1 1/2008
EP 1353140 A2 10/2003

(Continued)

OTHER PUBLICATIONS

UK Search Report, Application No. GB1012520.1, dated Nov. 23, 2010.
Melexis, MLX90333, Product Specification, Rev. 002, Mar. 2009, p. 1-43.

(Continued)

*Primary Examiner* — Arleen M Vazquez
*Assistant Examiner* — Son Le
(74) *Attorney, Agent, or Firm* — James F. Hann; Haynes Beffel & Wolfeld LLP

(57) ABSTRACT

A control device is provided configured to provide user control signals. The control device comprises a magnetic flux sensing unit configured to provide two-dimensional angular orientation information with respect to a magnetic field acting on the magnetic flux sensing unit, and the user control signals are dependent on the two-dimensional angular orientation information. The control device further comprises a magnet arrangement comprising at least two permanent magnets configured to generate the magnetic field. The magnet arrangement and the magnetic flux sensing unit are arranged to be reoriented relative to one another within a predetermined range of movement, and the at least two permanent magnets are arranged relative to the magnetic flux sensing unit such that the magnetic field experienced by the magnetic flux sensing unit is substantially uniform throughout the predetermined range of movement.

20 Claims, 8 Drawing Sheets

(56) References Cited

U.S. PATENT DOCUMENTS

| | | |
|---|---|---|
| 2006/0028184 A1 | 2/2006 | Lewis et al. |
| 2008/0184843 A1 | 8/2008 | Klotzbuecher et al. |
| 2008/0315866 A1* | 12/2008 | Banerjee .................... 324/207.2 |
| 2009/0213073 A1* | 8/2009 | Obermeyer et al. .......... 345/161 |
| 2011/0089942 A1* | 4/2011 | Goodwill et al. ............. 324/301 |

FOREIGN PATENT DOCUMENTS

| | | |
|---|---|---|
| GB | 2450342 A | 12/2008 |
| JP | 2009139252 A | 6/2009 |
| WO | 0169343 A1 | 9/2001 |

OTHER PUBLICATIONS

AN5011-10 Low power Hall IC—Using the AS5011 in joystick applications, rev 3.0, Jul. 31, 2008, p. 1-9.

Angular position sending with 2-Axis Hall IC 2SA10, Feb 12, 2004, Sentron AG (A Melexis Company), pp. 1-7.

Extended European Search Report, for Corresponding EP Application No. 11171167.7-1264; dated Nov. 30, 2011; 5 pages.

Office Action in corresponding EP Application No. GB1012520.1; dated Oct. 24, 2013; 4 pp.

Office Action (translated) in corresponding CN Application No. 201110211677.6; dated May 18, 2014; 14 pp.

* cited by examiner

US 8,829,894 B2

CONTROL DEVICE

BACKGROUND OF THE INVENTION

1. Field of the Invention

The present invention relates to control devices configured to provide user control signals, in particular control devices providing two dimensional control information such as a joystick.

2. Description of the Prior Art

Control devices which provide user control signals based on the relative orientation of a magnetic flux sensor and a magnet are known. For example, a joystick may be constructed based on a familiar ball and socket arrangement, wherein a permanent magnet attached to the ball may be orientated with respect to a magnetic flux sensor mounted in the socket by means of a joystick handle protruding from the ball.

One such joystick arrangement is disclosed in US Published Patent Application 2006/0028184 (and is schematically illustrated in FIG. 1). This arrangement comprises a shaft 11 forming the joystick handle terminating in a ball 12 which encloses a permanent magnet 13. The ball 12 is mounted such that it may be rotated around two axes of rotation, namely when the joystick shaft 11 is pushed forwards-and-backwards or left-and-right. Surrounding the ball is a pole-piece frame arrangement formed of a material with a high magnetic permeability composed of four collector plates 18A, 18B, 18C and 18D equally spaced around the ball with four pole-piece arms 19A, 19B, 19C and 19D. The pole-piece arms connect the four collector plates to the corners of the pole-piece frame arrangement, where four pairs of plates 20A, 20B, 20C and 20D are arranged. Gaps 21A, 21B, 21C and 21D are formed between the four pairs of plates and in two of the gaps on one side of the pole-piece frame arrangement are a pair of identical Hall-effect sensors 22 aligned side-by-side. As the joystick shaft is moved through its range of movement, this changes the magnetic flux experienced in each of the gaps 21A and 21D (and hence by each pair of Hall-effect sensors 22). For example, if the joystick shaft 11 is angled towards gap 21A this will cause collector plates 18A and 18B to experience a biased magnetic polarity with respect to that experienced by collector plates 18C and 18D. Because of this, a magnetic flux will pass through the gaps 21B and 21D. Conversely, since gaps 21A and 21C experience the same magnetic potential no flux will pass across these gaps. The pair of sensors located within gap 21D will experience the flux change and thus generate an electrical signal due to the Hall-effect, which can be translated into a desired control signal by suitable electronics. The pairs of Hall-effect sensors 22 in gaps 21A and 21D provide a level of redundancy for the joystick device. However, the use of four Hall-effect sensors has an associated manufacturing cost. Conversely, one advantage of this joystick arrangement is that it is relatively insensitive to small offsets in the position of ball 12 and magnet 13 relative to the pole-piece frame arrangement, since it is differences in the magnetic polarity between pairs of collector plates which causes the magnetic flux to pass across the measuring gaps. This is advantageous in implementations of the joystick arrangement which are required to be robust, such as the controller of a wheelchair which is in daily use and may often be knocked, leant on and so on.

FIGS. 2A and 2B schematically illustrate two alternative joystick arrangements which make use of the measurement of magnetic flux variations using two-axis Hall-effect sensors. FIG. 2A schematically illustrates a gimbal based arrangement such as that disclosed in the "MLX90333 Triaxis 3D-Joystick Position Sensor" data sheet by Melexis, March 2009 and in the "Angular Position Sensing with Two-Axis Hall IC 2SA-10" note by Sentron (Melexis), February 2004. In this arrangement the joystick shaft 30 has a permanent magnet 32 mounted on its distal end which can be oriented with respect to a two-axis Hall-effect sensor 34 by means of a gimbal arrangement 36. The two-axis Hall sensor 34 is composed of a CMOS chip having a central ferro-magnetic disc and four Hall elements equally spaced around the disc's edge. The ferro-magnetic disc acts as a flux concentrator which converts magnetic field components parallel to the device surface into a component perpendicular to the device surface which can be measured by the Hall elements embedded in the surface of the CMOS chip. The four Hall elements thus provide two dimensional orientation information for the joystick based on a single sensor chip. This is advantageous in terms of manufacturing costs. However, a gimbal arrangement such as that illustrated in FIG. 2A must be carefully constructed such that the magnet 32 only moves within a limited range of movement—close enough to the sensor 34 that the sensor experiences a relatively uniform magnetic field, but at a sufficient distance from the sensor to allow an acceptable range of movement for the joystick without the magnet colliding with the sensor. Furthermore, such gimbal arrangements may have their spatial configuration easily altered by mechanical loads on the joystick, either static, such as a user leaning on the joystick or dynamic such as an impact. Such mechanical loading can easily upset the careful positioning required between the magnet 32 and the sensor 34.

FIG. 2B schematically illustrates another known joystick arrangement using a single Hall sensor integrated circuit 40, wherein the magnet 42 is mounted on the surface of a ball-shaped carrier 44 which is mounted in a socket. The joystick 48 extends from the ball-shaped carrier such that movement of the joystick 48 will cause rotation of the ball-shaped carrier 44 in the socket 46, changing the relative position of the magnet 42 and the Hall sensor 40. Such a joystick arrangement is disclosed in the technical note "AN5011-10 Low Power Hall IC" by Austria Microsystems, July 2008. A sliding plate 50 is urged against the socket 46 by means of a spring 52, causing the joystick 48 to tend to return to its upright position. Whilst this arrangement, like the arrangement in FIG. 2A, can make use of a single two-axis Hall sensor, correct operation of this joystick arrangement is dependent on the ball-shaped carrier 44 engaging the socket 46 in a close fit. Wear between the surfaces of the ball-shaped carrier 44 and the socket 46 will cause the ball-shaped carrier 44 to shift with respect to its original position in the socket 46 as the surfaces abrade due to the friction enhanced by the action of spring 52. Given that typical use of the joystick will result in asymmetric wear at the ball/socket interface, the ball might tend to move upwards and sideways over time. This would cause the relative positioning of magnet 42 and Hall sensor 40, and hence the output of the Hall sensor, to change with time. Furthermore, the arrangement in FIG. 2B is also sensitive to the static and dynamic mechanical loads discussed with reference to FIG. 2A.

Accordingly, it would be desirable to provide a control device which combined the lower manufacturing costs associated with the use of a single integrated circuit Hall sensor but which is more resilient to the mechanical stresses and strains imposed by rough handling without the interaction between magnet and Hall sensor being adversely affected.

SUMMARY OF THE INVENTION

Viewed from a first aspect, a control device is configured to provide user control signals comprising: a magnetic flux sensing unit configured to provide two-dimensional angular orientation information with respect to a magnetic field acting on said magnetic flux sensing unit, said user control signals being dependent on said two-dimensional angular orientation information; and a magnet arrangement comprising at least two permanent magnets configured to generate said magnetic field, wherein said magnet arrangement and said magnetic flux sensing unit are arranged to be reoriented relative to one another within a predetermined range of movement, and said at least two permanent magnets are arranged relative to said magnetic flux sensing unit such that said magnetic field experienced by said magnetic flux sensing unit is substantially uniform throughout said predetermined range of movement.

The control device may have a magnet arrangement which generates a magnetic field and a magnetic flux sensing unit which provides two dimensional angular orientation information with respect to that magnetic field. The relative orientation of the magnet arrangement and the magnetic flux sensing unit within a predetermined range of movement thus provides the user with a range of selectable positions which are translated by the control device into the user control signals. Whilst it is known to use a magnetic flux sensing unit configured to provide two dimensional angular orientation information with respect to a magnetic field generated by a permanent magnet, it is a feature of such arrangements that the relative positioning of the permanent magnet and the magnetic flux sensing unit is a critical design parameter, and furthermore that such control devices are not particularly tolerant to variations in that relative positioning that may occur as a result of mechanical loading or long-term wear. However, the inventors realised that by providing at least two permanent magnets configured to generate the magnetic field, the at least two permanent magnets could be arranged relative to the magnetic flux sensing unit such that as the magnetic flux sensing unit and magnet arrangement are reoriented relative to one another the magnetic field experienced by the magnetic flux sensing unit is substantially uniform throughout the range of movement. This arrangement provides a control device wherein the initial positioning (and ongoing positioning with age and wear) of the magnet arrangement and the magnetic flux sensing unit is less critical to the operation of the device and user control signals may be generated with greater reliability over a longer lifetime of the device.

The magnet arrangement may be configured in various ways, but in some embodiments said at least two permanent magnets are arranged on opposite sides of said magnetic flux sensing unit. It has been found that an arrangement of at least two permanent magnets arranged on opposite sides of the magnetic flux sensing unit provides an arrangement in which the magnetic field generated by the at least two permanent magnets has a region between the at least two permanent magnets which is substantially uniform and it is therefore advantageous to position the magnetic flux sensing unit within this uniform region, such that throughout the relative movement of the magnet arrangement and the magnetic flux sensing unit the magnetic flux sensing unit remains within this uniform region.

The at least two permanent magnets in such embodiments may take a number of forms, but in some embodiments said at least two permanent magnets comprise two coaxial ring magnets, said coaxial ring magnets being axially magnetised. Axially magnetised ring magnets arranged coaxially to one another have been found to provide a significant region in the volume of space formed between the two rings which has a substantially uniform magnetic field.

Various configurations of these two coaxial ring magnets are of course possible, but in a preferred embodiment the two coaxial ring magnets are arranged at a separation which is substantially equal to a diameter of each ring magnet. In this context, this means that the separation of the two magnets corresponds to the diameter of the magnets to within 25% (larger or smaller). This configuration has been found to generally result in the greatest spatial extent of the region of uniform magnetic field between the two magnets.

As well as the separation of the two coaxial ring magnets, the dimensions of each ring magnet also play a role in determining the characteristics of the magnetic field produced between them. In one embodiment, said two coaxial ring magnets each have an outer diameter and an inner diameter selected such that a mean diameter of each ring magnet is approximately three-quarters of said separation, and each ring magnet has a thickness which is approximately one-quarter of said separation. Variations in these ratios of up to 25% are envisaged. Such configurations have been found to provide a beneficial trade-off between the strength/extent of the magnetic field generated and other constructional constraints on the size of each ring magnet (e.g. when the ring magnets are mounted within a moulded plastic ball of fixed size, the mechanical strength of the plastic ball).

The magnet arrangement may be formed in a number of different ways, and in one embodiment said at least two permanent magnets comprise a Halbach array of permanent magnets. A Halbach array of permanent magents, such as a sequence of permanent magnets at varying orientations to one another around a central space, can also provide a substantial region of uniform magnetic field within that central space.

The magnetic flux sensing unit may take a number of forms, but in some embodiments said magnetic flux sensing unit comprises an integrated circuit comprising Hall-effect sensing elements. Providing the magnetic flux sensing unit as an integrated circuit is advantageous due to the relative manufacturing ease of integrated circuits and furthermore Hall-effect sensing elements may easily be included in such integrated circuits.

In some such embodiments wherein the magnetic flux sensing unit comprises an integrated circuit, the magnetic flux sensing unit may comprise an integrated magnetic concentrator. Such an integrated magnetic concentrator, such as a ferromagnetic disc, can convert magnetic field components parallel to the magnetic flux sensing unit into components perpendicular to the magnetic flux sensing unit and thus enhance the ability of the unit to detect changes in the magnetic flux in two dimensions.

The particular manner in which the magnet arrangement and the magnetic flux sensing unit are arranged to be reoriented relative to one another may vary. In some embodiments said magnet arrangement is arranged to be reoriented relative to said magnetic flux sensing unit, whilst in other embodiments said magnetic flux sensing unit is arranged to be reoriented relative to said magnet arrangement.

The control device may take a number of forms, but an embodiment which presents the user with an intuitive interface is provided when said control device is formed as a joystick.

In some embodiments said control device comprises a resilient member configured to urge said magnet arrangement to a substantially central position within said predetermined range of movement. This arrangement presents the user with a particularly convenient control interface, wherein the magnet arrangement and magnetic flux sensing unit (in the absence of user action) are returned to a central position with respect to one another.

In some embodiments said control device comprises a shaft terminating in a ball, said ball arranged to be rotated around two axes of rotation in a socket. This provides a practical arrangement for the control device, wherein the shaft may form a prominent handle which the user can manipulate, whilst the ball is secured in the socket whilst still permitting two degrees of freedom around the two axes of rotation.

In some such embodiments, said magnet arrangement is integrally formed in said ball. Hence, by manipulating the shaft the user may rotate the ball within the socket and thus position the magnet arrangement relative to the magnetic flux sensing unit.

In some such embodiments said ball comprises two trunnions, each trunnion arranged to engage with a corresponding slot formed in said socket. The provision of two trunnions which engage with corresponding slots formed in the socket provides a mechanism to ensure that the ball may only be rotated around two (and not three) axes of rotation in the socket. This is because each trunnion may move along its slot or rotate within the slot but cannot move laterally with respect to the length of the slot.

In some such embodiments said slots run substantially parallel to said shaft when said magnet arrangement is in said substantially central position. Arranging the slots to run substantially parallel to the shaft in this manner provides that the two axes of rotation about which the ball may rotate in the socket are those which are not coaxial with the shaft. This prevents the shaft from rotating around its own axis, which may be desirable, for example in the context of a joystick for wheelchair users, and also reduces the sensitivity of the device to any slight axial misalignment of the magnet arrangement from the true central position.

In some embodiments said ball comprises a cut-out region, said magnetic flux sensing unit being mounted onto said socket and protruding into said ball via said cut-out region. This cut-out region enables the magnetic flux sensing unit to be essentially within the ball and hence rotation of the ball within the socket provides a rotation around the magnetic flux sensing unit, hence directly translating rotation of the ball into reorientation of the magnet arrangement with respect to the magnetic flux sensing unit.

In some embodiments said cut-out region traverses said ball. Providing a cut-out region which traverses the ball, i.e. passing from one side of the ball through to the other, provides an arrangement in which the magnetic flux sensing unit may protrude a long way into the ball (and indeed through it) providing a range of configuration possibilities, for example for mounting the magnetic flux sensing unit relative to the socket.

In some embodiments said cut-out region flares outwardly. An outward flare to the cut-out region allows rotation of the ball without the ball coming into contact with any part of the magnetic flux sensing unit which protrudes into the ball. Essentially, the degree to which the cut-out region flares corresponds to the angle from the central position with which the shaft may be tilted.

In some embodiments said magnetic flux sensing unit is arranged at a centre of rotation of said ball in said socket, said centre of rotation formed at a point where said two axes of rotation meet. Positioning the magnetic flux sensing unit at the point where the two axes of rotation meet provides an arrangement in which the magnetic flux sensing unit is located so as to respond equally sensitively to motion of the ball around either axis of rotation.

In some embodiments said magnetic flux sensing unit comprises at least two magnetic flux sensing units adjacently arranged. Providing two magnetic flux sensing units provides a level of redundancy, making the control device more reliable. Furthermore the extent of the substantially uniform magnetic field is sufficient that two magnetic flux sensing units may be adjacently arranged, whilst still both experiencing the substantially uniform magnetic field.

In some embodiments said control device comprises a ferro-magnetic shield configured to shield said magnetic field surrounding said magnetic flux sensing unit from external influence. The configuration of the magnetic field provided by the magnet arrangement is an important factor in the construction of the control device, and a ferro-magnetic shield may help to avoid variations or disturbance in that magnetic field from an external source.

Viewed from a second aspect, a control device is configured to provide user control signals comprising: magnetic flux sensing means for providing two-dimensional angular orientation information with respect to a magnetic field acting on said magnetic flux sensing means, said user control signals being dependent on said two-dimensional angular orientation information; and a magnet arrangement comprising at least two permanent magnet means for generating said magnetic field, wherein said magnet arrangement and said magnetic flux sensing means are arranged to be reoriented relative to one another within a predetermined range of movement, and said at least two permanent magnet means are arranged relative to said magnetic flux sensing means such that said magnetic field experienced by said magnetic flux sensing means is substantially uniform throughout said predetermined range of movement.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 3A:
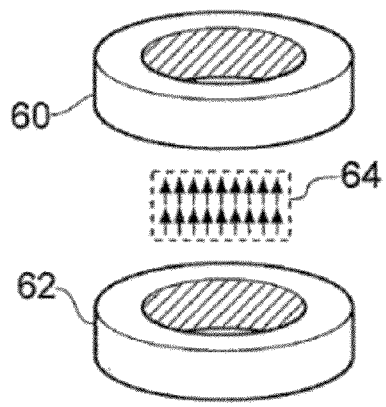
FIGS. 3A, 3B and 3C schematically illustrate magnet arrangements according to different embodiments.
Figure 3B:
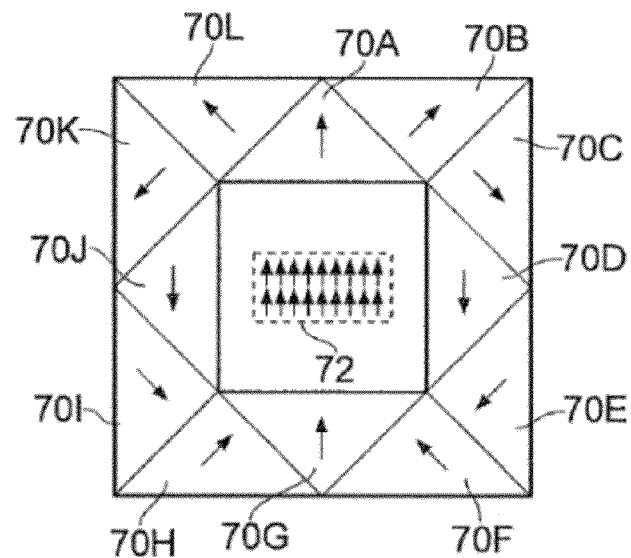
Figure 3C:
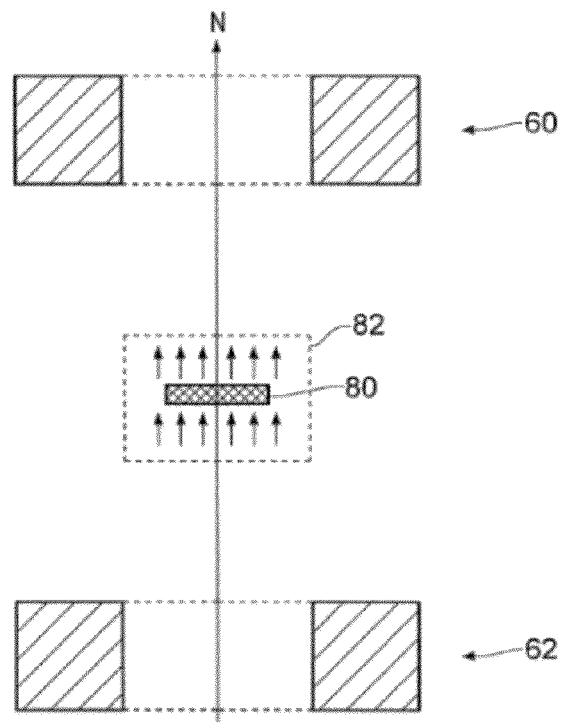

FIGS. 3A, 3B and 3C schematically illustrate the magnet arrangement according to some exemplary embodiments. FIG. 3A shows a pair of ring magnets 60, 62 which are arranged coaxially with one another. Each ring magnet 60, 62 is also coaxially magnetised, having their respective axis of magnetisation aligned. This arrangement results in a magnetic field being generated, of which there is a region 64 located between the ring magnets across which the generated magnetic field is substantially uniform. This substantially uniform region of magnetic field may also be generated by magnet arrangements other than a pair of ring magnets. FIG. 3B schematically illustrates a magnet arrangement composed of 12 regions 70A-L, each having its magnetisation aligned at an angle to the magnetisation of its neighbour. Such an arrangement of magnets is sometimes known as a Halbach array. Within the cavity defined by the surrounding set of magnets 70 there is also a region 72 across which the magnetic field generated by the magnets 70A-L is substantially uniform.

FIG. 3C schematically illustrates a side view of an arrangement of ring magnets such as that illustrated in FIG. 3A. Here the ring magnets 60, 62 are seen in cross-section in a plane in which the axis of the ring magnets lies. In this example each ring magnet 60, 62 has a diameter of approximately 8 mm, whilst the space between the two ring magnets is also approximately 8 mm. The diameter and spacing should generally correspond to within 25%. The central aperture of each ring magnet is approximately 4 mm in diameter and the solid cross-section of each ring magnet is approximately 2 mm by 2 mm. In one embodiment the ring magnets have a separation of 8 mm from one another, whilst each ring magnet has an outer diameter of 7.9 mm and an inner diameter of 3.75 mm. Each ring magnet has a thickness of 2.0 mm. In another embodiment the ring magnets also have a separation of 8 mm from one another, whilst each ring magnet has an outer diameter of 7.0 mm and an inner diameter of 4.4 mm. Each ring magnet again has a thickness of 2.0 mm. In general it has been found that a useful trade-off between the strength/extent of the magnetic field generated and the mechanical strength of the moulded plastic ball in which the ring magnets are mounted (see the following description) is reached when the two coaxial ring magnets each have an outer diameter and an inner diameter selected such that a mean diameter of each ring magnet is approximately three-quarters of the separation between the ring magnets, and each ring magnet has a thickness which is approximately one-quarter of that separation. These ratios may have some variation (e.g. a given dimension varying up to 25% either way).

A magnetic flux sensing unit 80 is centrally situated between the ring magnets 60, 62. It can be seen that the region 82 within which the magnetic field is substantially uniform is sufficient to completely enclose the magnetic flux sensing unit 80. This means that the magnetic flux sensing unit 80 will provide a consistent measured output even if some lateral displacement of the magnetic flux sensing unit 80 with respect to the magnet arrangement 60, 62 occurs.

Figure 4:
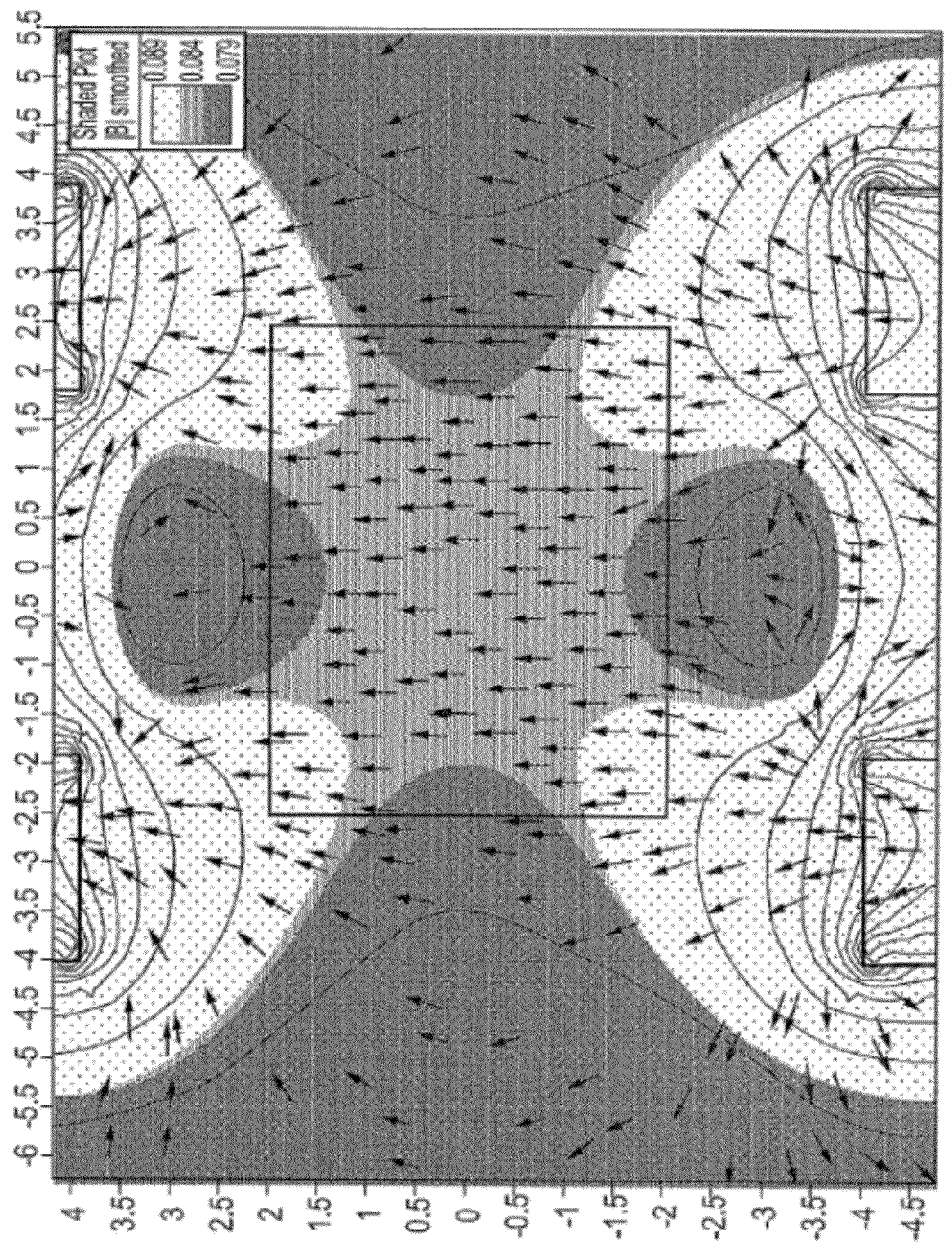
FIG. 4 illustrates a simulation of the magnetic field strength in the region within the magnet arrangement illustrated in FIG. 3C.

FIG. 4 shows a simulation of the generated magnetic field in the region between two coaxially aligned and coaxially magnetised ring magnets, such as those schematically illustrated in FIGS. 3A and 3C. In FIG. 4 the cross sections of ring magnets themselves can be seen overlapping the top and bottom of the Figure respectively. To be noted in FIG. 4 is the central boxed region in which it can be seen that the magnetic field strength (represented by the arrows) is substantially uniform across almost the whole boxed area, with only minor deviations at the corners. A central region of the box covering about 2 mm×2 mm is essentially uniform. The scale on FIG. 4 indicates that the whole boxed region is approximately 5 mm wide and 4 mm high.

Figure 5:
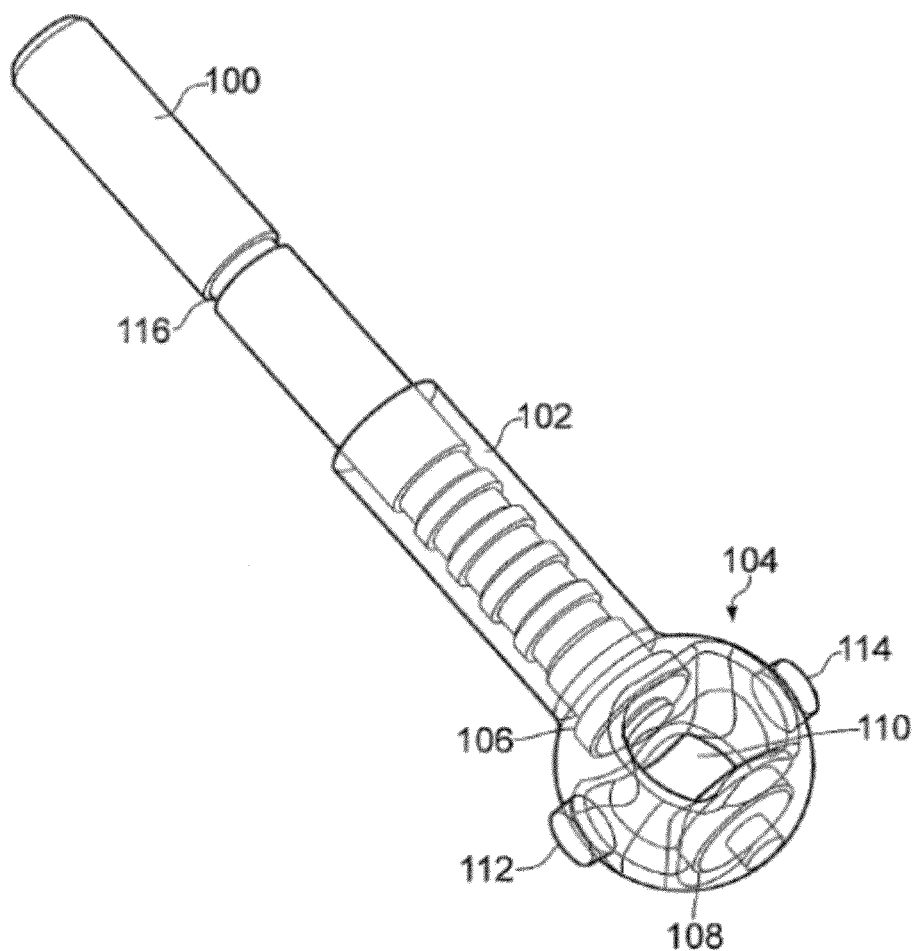
FIG. 5 schematically illustrates the shaft, ball and magnet arrangement according to one embodiment.

FIG. 5 schematically illustrates an integrally formed shaft and ball arrangement containing two ring magnets, which forms part of an embodiment of the control device when formed as a joystick. Metal shaft 100 is embedded in moulded plastic sleeve 102 which is integrally formed with moulded plastic ball 104. The two ring magnets 106, 108 are situated either side of a cut-out region 110 which traverses the ball 104. The ball 104 also comprises two trunnions 112, 114 which protrude from either side of the ball. These trunnions 112, 114 are arranged to engage in slots formed in the socket in which ball 104 is housed. When the joystick, of which shaft 100 forms the central part, is in a substantially central position the slots in the socket run parallel to the main axis of the shaft 100. This provides that the joystick may be moved laterally by pushing the shaft side-to-side or forwards-and-backwards, but the shaft cannot be rotated around its major axis. This limitation on the possible movement of the shaft is useful when the joystick is provided as a control device for wheelchair users, and also reduces the sensitivity of the device to any slight axial misalignment of the magnet arrangement from the true central position.

Figure 1:
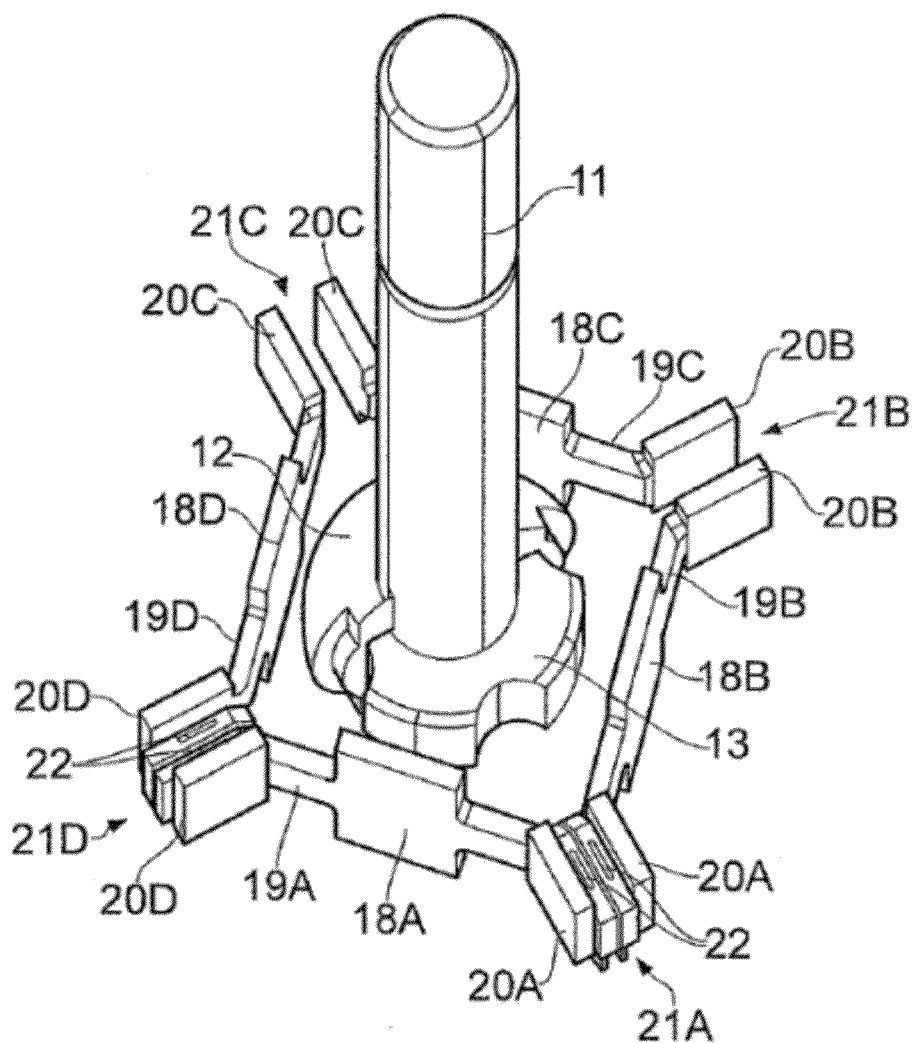
FIG. 1 schematically illustrates a known control device using multiple Hall-effect sensors.
Figure 2A:
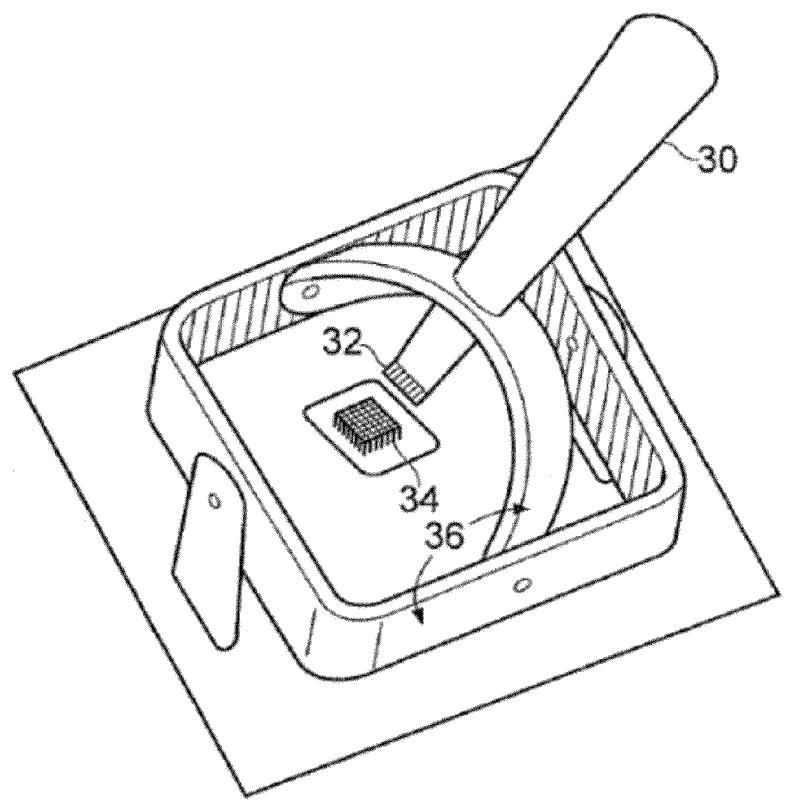
FIG. 2A schematically illustrates a known control device using a gimbal arrangement and a single two-axis Hall-effect sensor.
Figure 2B:
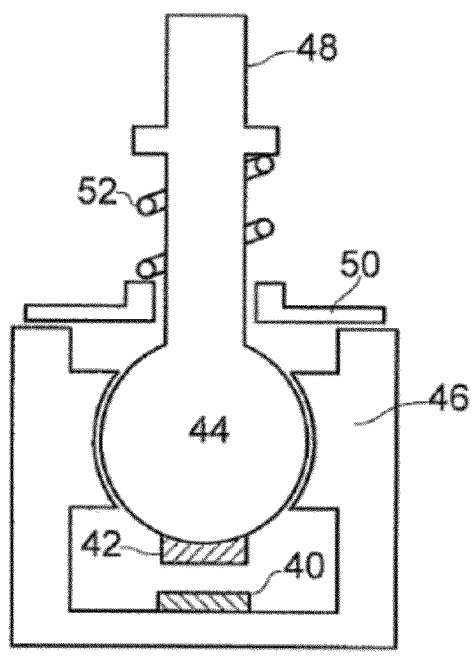
FIG. 2B schematically illustrates a known control device using a ball and socket arrangement and a single Hall-effect sensor.

This ensures that the relative orientation of the ring magnets 106, 108 and a magnetic flux sensing unit located in cut-out region 110 (discussed in more detail with reference to FIG. 7) does not change. The shaft 100 has a notch 116 which allows the engagement of a resilient member such as a spring, provided to urge the shaft to return to a substantially central position when the ball 104 is mounted in its socket (see FIG. 2B).

Figure 6:
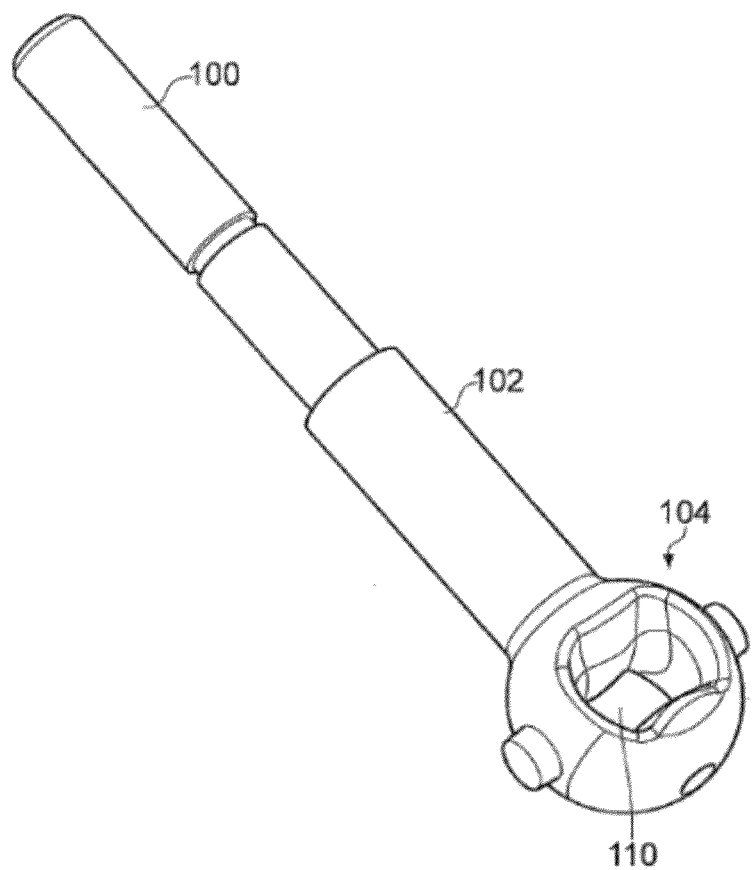
FIG. 6 schematically illustrates the shaft and ball arrangement according to one embodiment.

FIG. 6 shows a similar view to that of FIG. 5, but in FIG. 6 the moulded plastic from which sleeve 102 and ball 104 is formed is represented opaquely, to illustrate the shaping of the cut-out region 110 in more detail. It can be seen that the cut-out region 110 flares outwardly. This configuration provides that when a magnetic flux sensing unit, such as a two axis Hall sensor, is situated in the cut-out region 110, the shaft 100 can be laterally moved to cause rotation of the ball 104, without the magnetic flux sensing unit colliding with the internal walls of the ball 104.

Figure 7:
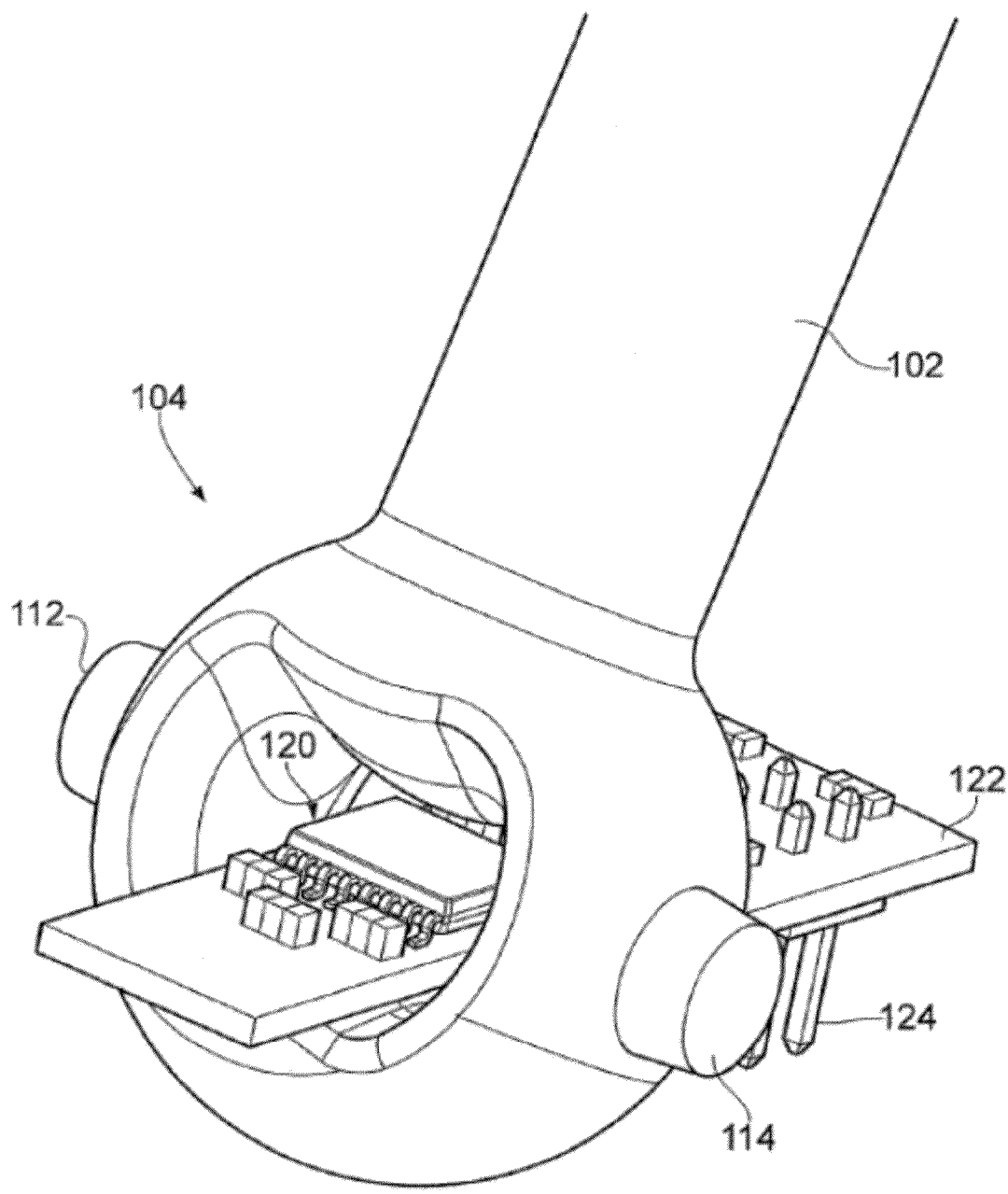
FIG. 7 schematically illustrates a more detailed view of the ball together with an inserted magnetic flux sensing unit according to one embodiment.

FIG. 7 illustrates in more detail the ball 104, in particular showing an arrangement in which a magnetic flux sensing unit 120 formed as part of an integrated circuit 122 is arranged passing through the cut-out region of the ball 104. Passing the integrated circuit 122 through the cut-out region of the ball 104 in this manner allows the magnetic flux sensing unit 120 to be positioned at the centre of the ball 104, whilst the integrated circuit 122 on which the magnetic flux sensing unit 120 is located can be firmly mounted with respect to the socket in which ball 104 is located.

The magnetic flux sensing unit 120 is, in this embodiment, a TSSOP16 package manufactured by Melexis and comprises two MLX90333 Hall-effect sensors arranged adjacent to one another. The two dots on the surface of the package 120 in FIG. 7 indicate the point at which the two devices are sensitive to the magnetic field (see also FIG. 8B). The integrated circuit 112 comprises output pins 124 which connect the integrated circuit to components outside the joystick.

Figure 8A:
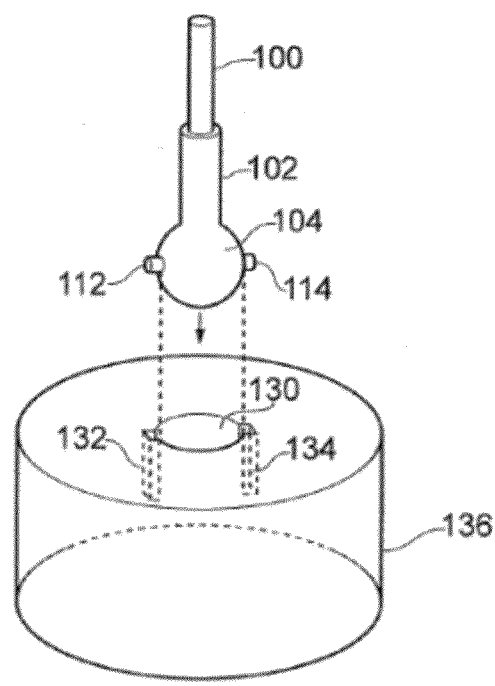
FIG. 8A schematically illustrates the engagement of trunnions on a ball into a socket surrounded by a ferro-magnetic shield according to one embodiment.

FIG. 8A schematically illustrates the insertion of the ball 104 into its corresponding socket 130. Socket 130 has lateral slots 132 and 134 which correspond to the trunnions 112 and 114 respectively. In the illustrated configuration the slots 132, 134 run parallel to the shaft 100, when shaft 100 is in the neutral, substantially vertical position. Hence, once engaged in socket 130, ball 140 can rotate around two axes. The first rotational axis corresponds to the axis defined by the trunnions 112, 114. The second rotational axis corresponds to a direction approximately perpendicular to the plane of the illustration, such that rotation about this axis raises one trunnion, whilst lowering the other trunnion. However, the engagement of the trunnions 112,114 in the slots 132, 134 prevents the ball 104 from rotating about its third axis, namely that which lies parallel to the shaft 100. In other words, the user is prevented from twisting the shaft to cause it to rotate around its major axis. FIG. 8A further illustrates an outer "can" 136, constructed from a ferro-magnetic material, which acts as a shield to reduce the influence of external sources of magnetic fields over the magnetic field within the can and in particular in the region between the two ring magnets.

Figure 8B:
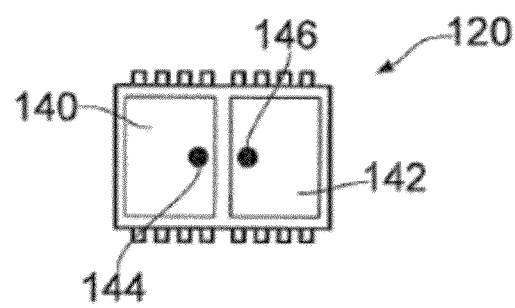
FIG. 8B schematically illustrates a magnetic flux sensing unit comprising two adjacent magnetic flux sensing unit according to one embodiment.

FIG. 8B illustrates in more detail the magnetic flux sensor 120 shown in FIG. 7. Shown is a plan view of the TSSOP16 package 120, which mounts two dies 140, 142. Each die forms the basis of a two-axis Hall-effect sensor. The dots 144, 146 show the sensitivity points of each sensor, which are offset towards the centre of the integrated circuit device, so that each is exposed to a very similar magnetic field. The extent of the uniform region of magnetic field generated by the pair of ring magnets (see for example FIGS. 3C and 4) is sufficient to fully enclose both dots 144, 146. Furthermore the uniform region extends beyond each such that even if the sensor 120 becomes laterally offset, either due to an impact or due to repositioning with wear, the magnetic field experienced by the sensor is substantially unchanged.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A control device configured to provide user control signals comprising:
   a magnetic flux sensing unit configured to provide two-dimensional angular orientation information with respect to a magnetic field acting on said magnetic flux sensing unit, said user control signals being dependent on said two-dimensional angular orientation information;
   a socket;
   a shaft terminating in a ball, said ball arranged to be rotated around two axes of rotation in the socket;
   said ball comprising a cut-out region, said magnetic flux sensing unit being mounted onto said socket and protruding into said ball via said cut-out region; and
   a magnet arrangement comprising at least two permanent magnets configured to generate said magnetic field,
   wherein said magnet arrangement and said magnetic flux sensing unit are arranged to be reoriented relative to one another within a predetermined range of movement, and said at least two permanent magnets are arranged relative to said magnetic flux sensing unit such that said magnetic field experienced by said magnetic flux sensing unit is substantially uniform throughout said predetermined range of movement.

2. The control device as claimed in claim 1, wherein said at least two permanent magnets are arranged on opposite sides of said magnetic flux sensing unit.

3. The control device as claimed in claim 2, wherein said at least two permanent magnets comprise two coaxial ring magnets, said coaxial ring magnets being axially magnetised.

4. The control device as claimed in claim 3, wherein said two coaxial ring magnets are arranged at a separation which is substantially equal to a diameter of each ring magnet.

5. The control device as claimed in claim 1, wherein said at least two permanent magnets comprise a Halbach array of permanent magnets.

6. The control device as claimed in claim 1, wherein said magnetic flux sensing unit comprises an integrated circuit comprising Hall-effect sensing elements.

7. The control device as claimed in claim 6, wherein said magnetic flux sensing unit comprises an integrated magnetic concentrator.

8. The control device as claimed in claim 1, wherein said magnet arrangement is arranged to be reoriented relative to said magnetic flux sensing unit, wherein said magnetic flux sensing unit is fixedly mounted with respect to said socket in which said ball is mounted.

9. The control device as claimed in claim 1, wherein said control device is formed as a joystick.

10. The control device as claimed in claim 1, wherein said control device comprises a resilient member configured to urge said magnet arrangement to a substantially central position within said predetermined range of movement.

11. The control device as claimed in claim 1, wherein said magnet arrangement is integrally formed in said ball.

12. The control device as claimed in claim 1, wherein said ball comprises two trunnions, each trunnion arranged to engage with a corresponding slot formed in said socket.

13. The control device as claimed in claim 12, wherein said control device comprises a resilient member configured to urge said magnet arrangement to a substantially central position within said predetermined range of movement, wherein said slots run substantially parallel to said shaft when said magnet arrangement is in said substantially central position.

14. The control device as claimed in claim 1, wherein said cut-out region traverses said ball.

15. The control device as claimed in claim 1, wherein said cut-out region flares outwardly.

16. The control device as claimed in claim 1, wherein said magnetic flux sensing unit is arranged at a centre of rotation of said ball in said socket, said centre of rotation formed at a point where said two axes of rotation meet.

17. The control device as claimed in claim 1, wherein said magnetic flux sensing unit comprises at least two magnetic flux sensing units adjacently arranged.

18. The control device as claimed in claim 1, wherein said control device comprises a ferro-magnetic shield configured to shield said magnetic field surrounding said magnetic flux sensing unit from external influence.

19. A control device configured to provide user control signals comprising:
   a magnetic flux sensing unit configured to provide two-dimensional angular orientation information with respect to a magnetic field acting on said magnetic flux sensing unit, said user control signals being dependent on said two-dimensional angular orientation information; and a magnet arrangement comprising at least two permanent magnets configured to generate said magnetic field, wherein said magnet arrangement and said magnetic flux sensing unit are arranged to be reoriented relative to one another within a predetermined range of movement, said at least two permanent magnets are arranged relative to said magnetic flux sensing unit such that said magnetic field experienced by said magnetic flux sensing unit is substantially uniform throughout said predetermined range of movement, said at least two permanent magnets comprise two axially magnetized coaxial ring magnets arranged on opposite sides of said magnetic flux sensing unit, said two coaxial ring magnets are arranged at a separation which is substantially equal to a diameter of each ring magnet, and said two coaxial ring magnets each have an outer diameter and an inner diameter selected such that a mean diameter of each ring magnet is approximately three-quarters of said separation, and each ring magnet has a thickness which is approximately one-quarter of said separation.

20. A control device configured to provide user control signals comprising:

magnetic flux sensing means for providing two-dimensional angular orientation information with respect to a magnetic field acting on said magnetic flux sensing means, said user control signals being dependent on said two-dimensional angular orientation information;

a socket;

a shaft terminating in a ball, said ball arranged to be rotated around two axes of rotation in the socket; along with the said ball comprising a cut-out region, said magnetic flux sensing unit being mounted onto said socket and protruding into said ball via said cut-out region; and a magnet arrangement comprising at least two permanent magnet means for generating said magnetic field, wherein said magnet arrangement and said magnetic flux sensing means are arranged to be reoriented relative to one another within a predetermined range of movement, and said at least two permanent magnet means are arranged relative to said magnetic flux sensing means such that said magnetic field experienced by said magnetic flux sensing means is substantially uniform throughout said predetermined range of movement.

* * * * *